Figure 1:
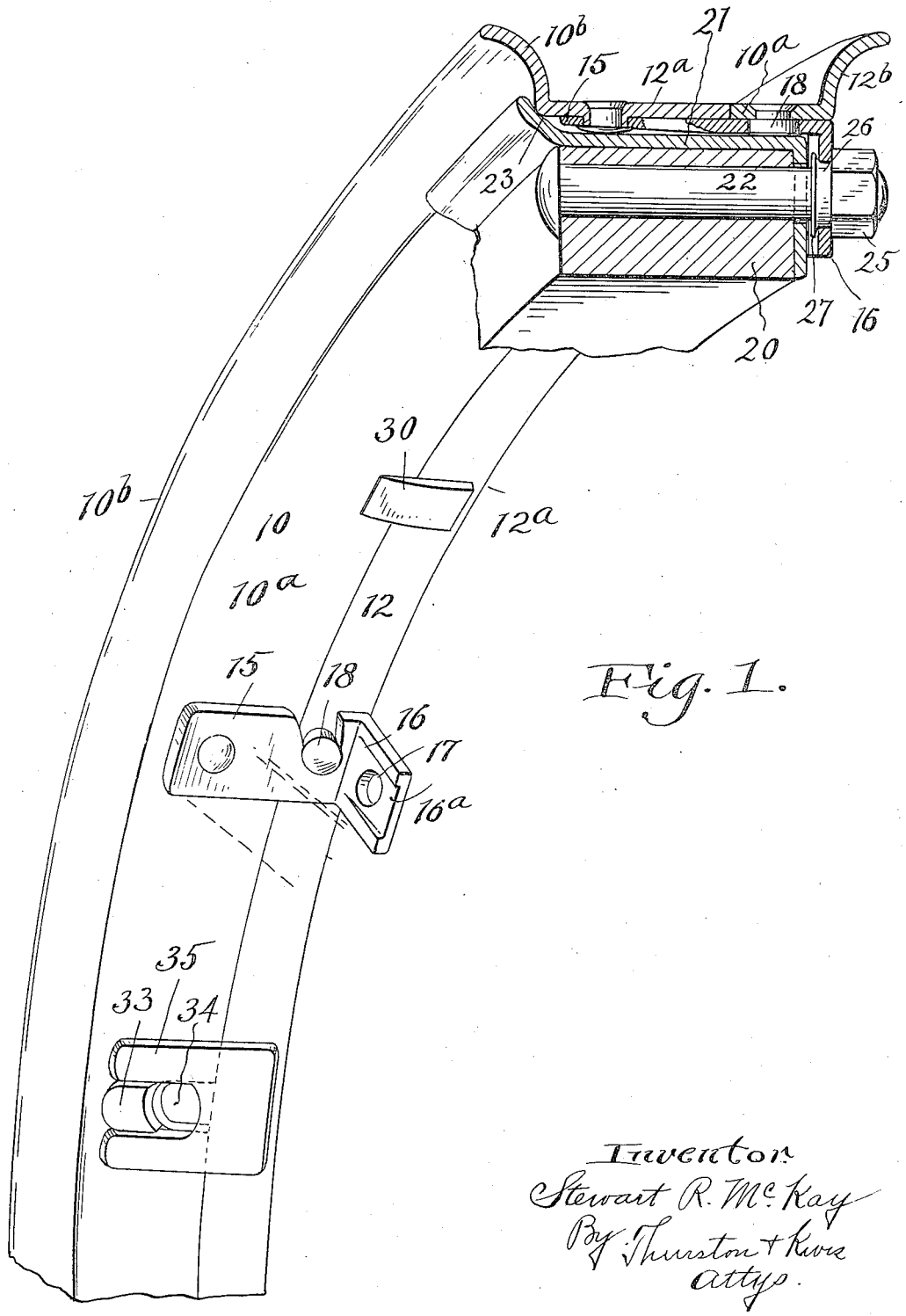

S. R. McKAY.
DEMOUNTABLE RIM.
APPLICATION FILED JAN. 29, 1917.

1,285,757.

Patented Nov. 26, 1918.

Inventor
Stewart R. McKay
By Thurston & Rives
attys.

UNITED STATES PATENT OFFICE.

STEWART R. McKAY, OF CLEVELAND, OHIO, ASSIGNOR TO THE McKAY COMPANY, OF CLEVELAND, OHIO, A CORPORATION OF OHIO.

DEMOUNTABLE RIM.

1,285,757.      Specification of Letters Patent.      Patented Nov. 26, 1918.

Application filed January 29, 1917. Serial No. 145,055.

*To all whom it may concern:*

Be it known that I, STEWART R. McKAY, a citizen of the United States, residing at Cleveland, in the county of Cuyahoga and State of Ohio, have invented a certain new and useful Improvement in Demountable Rims, of which the following is a full, clear, and exact description.

The object of the invention is to provide at reasonable cost, a demountable tire holding rim for automobile wheels which is so constructed that a pneumatic tire may be easily taken from or put upon it; which will securely hold said tire, when inflated, as well when the rim is demounted as when secured upon a wheel, and which may be easily mounted upon and secured to a wheel, or demounted therefrom when desired.

With these ends in view, the invention consists in the construction and combination of parts shown in the drawing, hereinafter described, and pointed out definitely in the appended claim.

In the drawing, the figure is a perspective view of a part of a rim which embodies the invention, and shows, in radial section, the rim, felly, and felly band, and means for fastening the rim upon the felly band, that is to say, upon the wheel.

The rim includes two annular sections 10 and 12, each of which is shown to consist of a substantially cylindrical portion $10^a$, $12^a$, and an outwardly extended flange $10^b$, $12^b$; and these two annular sections carry the means through which the completed rim may be secured upon a wheel, and by which these two annular sections are secured together in the desired relationship with each other, that is to say, with the edges of the two cylindrical parts in substantial contact, as shown, whereby there will be formed a rim with an external annular channel for holding a pneumatic tire. The flanges $10^b$, $12^b$, may have any shape suitable for use with the particular form of tire to be held thereon.

These two rim sections are locked together by means of a plurality of locking hooks 15. Each of these is pivoted on a substantially radial pivot to the inner face of the cylindrical part $10^a$ of that rim section which is the inside section when the rim is secured on the felly band 21 of the felly 20 to which the rim is fitted.

The outside rim section 12 is provided on its cylindrical portion with a plurality of short radially extended locking studs 18 one for each of said locking hooks, and so placed that the locking hooks may severally engage with them.

The two rim sections may be initially placed in proper relation to each other so that the hooks may engage the studs, and the relative turning of said rim sections after they have been locked together may be prevented by certain interlocking parts carried by said rim sections; for example, an inwardly projecting lug 33 may be formed on or secured to the cylindrical part $10^a$ or fixed thereto adjacent the hole 34 through which the valve stem of the associated tire will project. A forked plate 35 may be fixed to the inner surface of the cylindrical portion $12^a$ of the outside rim member 12 in such position that said forked plate may embrace this stud, thereby helping to protect the valve stem of the tire, as well as aiding in locating the two rim sections relative to each other.

Likewise any desired number of centering fingers 30 may be secured to the inner side of the part $12^a$ of the rim member 12, and may project beyond the edge thereof so as to overlap and engage the inner surface of the part $10^a$ of the rim member 10. Preferably the inner faces of the centering fingers are beveled as shown so that as the rim is being put on the wheel, these beveled surfaces will engage the felly band and aid in centering the rim.

Each of the locking hooks 15 as shown is formed of a flat metal bar, whose free end is bent at right angles toward the axis of the rim to form clamping plate 16, which is parallel with the outer face of the felly; and this clamping plate has in its inside face a recess $16^a$; and this clamping plate has through it a hole 17 for the passage of a bolt 22 which is mounted in the usual way, on the felly 20 of the wheel, and projects from the outer face thereof. The felly band 21 which embraces the felly may be of any well known or suitable form constructed to facilitate the centering of the rim on the felly band as it is moved laterally thereon toward the inner edge of said felly band. It is shown with the usual conical inside flange $21^a$, with which the rim engages; but this felly band may as stated be otherwise constructed if desired. The lugs 30, and the forked plate 35 may be constructed for engagement with the external surface of this felly band and aid in centering the rim thereon. Each stud 14, which is primarily provided for engagement of a hook 15, may have an enlarged slightly convexed head 14a, which may also engage the outer surface of the felly band. When the locking hook engages a stud having this particular construction it will go between the head and the rim 12a.

When the rim is fitted onto the felly band it is locked thereon and to the wheel by nuts 25 that screw onto the projecting outer ends of the bolts 22, which bolts pass through the holes 17 in the clamping plates. As these nuts are screwed in the rim is moved laterally to the required position with respect to the wheel, and these nuts of course prevent the rim from moving in the contrary direction.

In order to facilitate the removal of the rim, when desired, each of the nuts 25 has a reduced portion 26 which passes through and is rotatable in the hole 17, and the inner end of this reduced portion is upset to form a head 27 that lies in the recess 16a and engages the inner face of said locking plate. When this construction is employed the unscrewing of the nuts will positively move the rim laterally outward on the wheel. This is a more or less valuable feature, particularly in case the rim is disposed at all to stick to the felly band.

From the foregoing it is apparent that the two rim sections are so securely locked together by the devices provided for that purpose that the resulting rim will hold an inflated pneumatic tire when the rim is demounted from the wheel; and also that the same locking hooks which secure the two rim sections together are also utilized for fastening the rim upon a wheel; and attention is called to the fact that when the rim is secured on the wheel in the manner stated, and it and the tire become subject to the strains of actual use, there is no possibility that the two rim sections may become separated.

Having described my invention, I claim:—

In a demountable rim, the combination of two annular rim sections each having a cylindrical portion and an outwardly extended flange at one edge thereof, a plurality of flat locking hooks each pivoted to the inner face of the cylindrical part of the inside rim section and having its free end bent radially toward the axis of said rim sections and perforated to form a clamping plate, and a plurality of studs which project radially inward from the cylindrical part of the outside rim section in position to be engaged by said flat locking hooks.

In testimony whereof, I hereunto affix my signature.

STEWART R. McKAY.